United States Patent [19]
Tokuda et al.

[11] Patent Number: 6,031,190
[45] Date of Patent: Feb. 29, 2000

[54] OPERATING MODE SWITCHING UNIT FOR BICYCLE

[75] Inventors: Toshihide Tokuda, Takatsuki; Shigeru Okamoto, Hirakata, both of Japan

[73] Assignee: Shimano Inc., Sakai, Japan

[21] Appl. No.: 09/149,653

[22] Filed: Sep. 8, 1998

[30]     Foreign Application Priority Data

Sep. 8, 1997   [JP]   Japan .................................. 9-260812

[51] Int. Cl.[7] .................................................. H01H 19/14
[52] U.S. Cl. ..................... 200/11 R; 200/517; 200/565; 200/568
[58] Field of Search ..................... 200/565, 568, 200/569, 564, 336, 517, 11 R, 11 D, 11 DA, 11 G, 11 K

[56]            References Cited

U.S. PATENT DOCUMENTS

| | | | |
|---|---|---|---|
| 3,300,594 | 1/1967 | Paine et al. | 200/564 X |
| 4,246,453 | 1/1981 | Marchese et al. | 200/11 R |
| 4,272,658 | 6/1981 | Crosby | 200/11 R X |
| 4,511,769 | 4/1985 | Sahakian et al. | 200/517 X |
| 4,945,195 | 7/1990 | Ipcinski | 200/569 X |
| 5,057,657 | 10/1991 | Skulic | 200/517 |
| 5,483,137 | 1/1996 | Fey et al. | |

*Primary Examiner*—Renee S. Luebke
*Attorney, Agent, or Firm*—William H. Murray

[57]           ABSTRACT

An operating mode switching unit for a bicycle includes a rotary knob disposed on a front surface of a panel and connected to a plate-shaped spring unit by an axle. The spring unit includes a first spring portion which can be elastically deformed in the direction toward the axle. A second spring portion which can be elastically deformed in the direction toward the panel is disposed nearer to the axle. The first spring portion has a first protrusion projecting radially outward, and the second spring portion has a second protrusion projecting in the direction away from the panel. The panel is formed in its rear surface with a wall having indentations into which the first protrusion can snap. A laminate member faces the rear surface of the spring unit and includes plural pairs of opposing switch contacts. Each pair of contacts are pressed to contact with each other by the second protrusion.

4 Claims, 4 Drawing Sheets

OPERATING MODE SWITCHING UNIT FOR BICYCLE

This invention relates to an operating mode switching unit for a bicycle in which an electrical motor is used to change gears engaging a chain to thereby change a transmission gear ratio.

BACKGROUND OF THE INVENTION

In a bicycle having a motor-driven derailleur, a motor for changing gears is located at a position where the derailleur is mounted. A motor control unit and a power battery are mounted on the bicycle at appropriate positions. An operating mode switching unit is attached to a handlebar and provides a control signal to the motor control unit. When an automatic mode is selected by the operating mode switching unit, the control unit automatically selects a transmission gear ratio corresponding to the speed of the bicycle sensed by a speed sensor mounted on the bicycle, and then causes the motor to shift gears to the one corresponding to the selected transmission gear ratio. When a manual mode is selected by the switching unit, the transmission gear ratio can be changed stepwise by manually operating a button provided in the switching unit. The switching between the automatic mode and the manual mode is provided by operating an operating mode switch included in the switching unit.

As the operating mode switch, a rotary switch may be used.

The operating mode switching unit is usually mounted on the handlebar of the bicycle. Therefore, the switching unit should be compact and also easy to operate. But, a rotary switch is relatively large, which is a bottleneck in downsizing the switching unit.

An object of the present invention is to provide an operating mode switching unit having a compact operating mode switch.

SUMMARY OF THE INVENTION

An operating mode switching unit for a bicycle according to the present invention has a panel, a rotary knob disposed on a first surface of the panel, and a spring unit disposed in a recess formed in a second surface of the panel. The spring unit is shaped like a plate and coupled to the rotary knob by an axle. Thus, the spring unit can be rotated together with the rotary knob. The plate-shaped spring unit includes a first spring portion disposed away from the axle and a second spring portion disposed between the first spring portion and the axle. The first spring portion can be elastically deformed toward the axle, and has a protrusion projecting in a direction away from the axle. The second spring portion is elastically deformable toward the panel, and has a protrusion projecting away from the panel.

The recess in the second surface of the panel has a wall along which the first spring portion moves as the spring unit is rotated about the axle. The wall has a plurality of indentations at predetermined locations for receiving the protrusion of the first spring portion. In proximity to the surface of the spring unit remote from the panel, switches are provided at positions corresponding to the respective indentations in the wall of the recess. Each switch has a pair of switch contacts facing each other. Each pair of switch contacts are brought into contact with each other when the protrusion of the second spring portion presses that pair of switch contacts, so that the switch becomes closed.

The protrusion of the second spring portion presses each pair of switch contacts when the protrusion of the first spring portion is brought into engagement with the indentation in the wall corresponding to that pair of switch contacts. The indentation into which the protrusion of the first spring portion snaps can be switched by rotating the knob and, hence, the spring unit.

DETAILED DESCRIPTION OF PREFERRED EMBODIMENT

Figure 1:
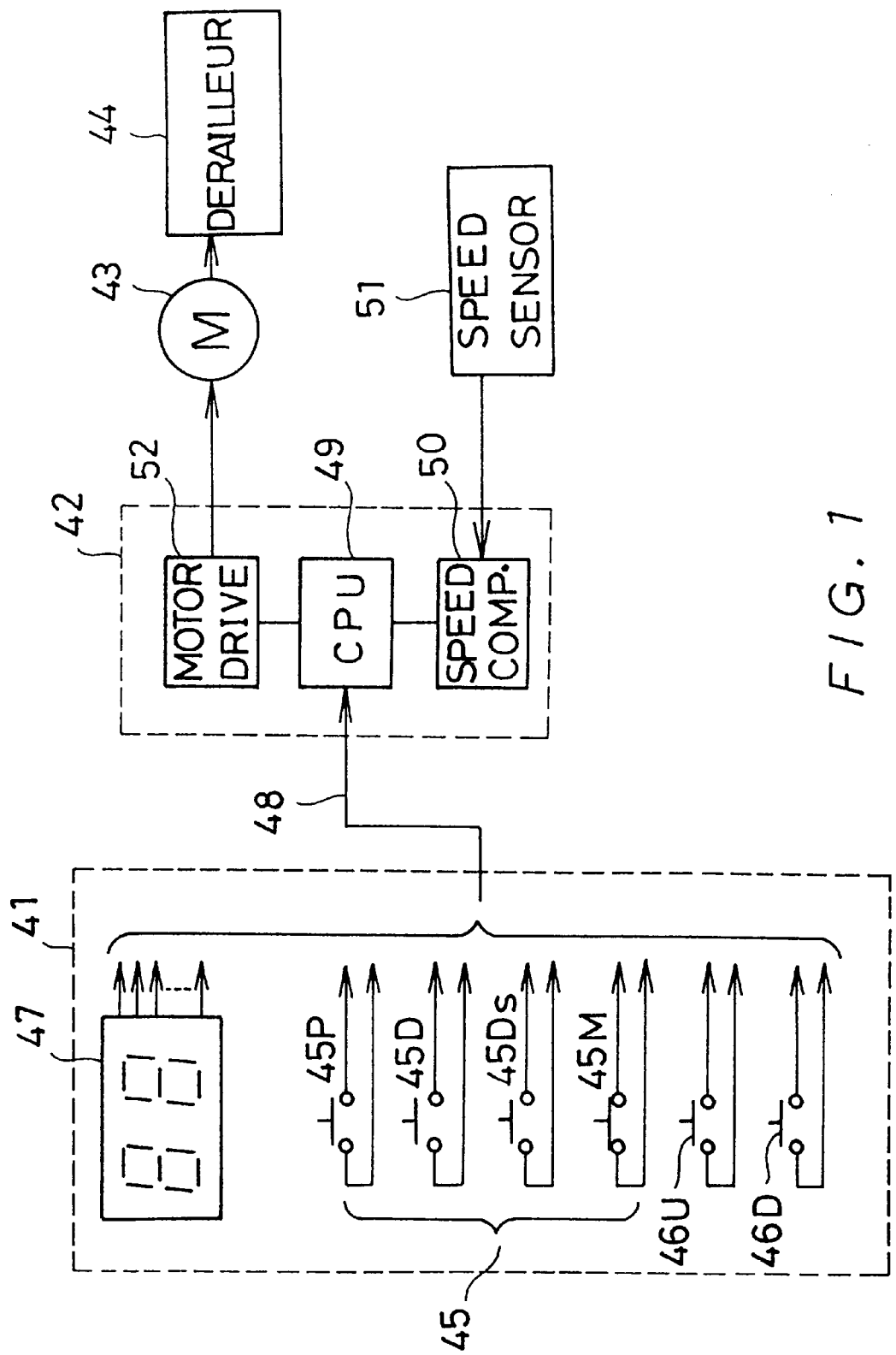
FIG. 1 is a block diagram of an electrical circuit of an apparatus for electrically changing a transmission gear ratio of a bicycle, including an operating mode switching unit according to the present invention.

FIG. 1 shows an apparatus for electrically changing a transmission gear ratio of a bicycle. This apparatus includes an operating mode switching unit 41 according to the present invention, a control unit 42, a motor 43 and a derailleur 44. The operating mode switching unit 41 is mounted on a handlebar of a bicycle, and the control unit 42 is mounted on the bicycle at an appropriate position. The derailleur 44 is mounted in association with a rear wheel of the bicycle in a known manner, and the motor 43 for operating the derailleur 44 is disposed near the derailleur 44.

The operating mode switching unit 41 has an operating mode switch assembly 45. The switch assembly 45 includes switches 45P, 45D, 45Ds and 45M. Only one of the switches is closed at a time. The switching unit 41 may additionally have a transmission-gear-ratio increasing switch 46U, a transmission-gear-ratio decreasing switch 46D and an indicator 47. These components of the switching unit 41 are connected through a cable 48 to the control unit 42.

The control unit 42 includes a CPU 49. The CPU 49 receives a signal indicating the speed of the bicycle supplied from a speed computing circuit 50. The speed computing circuit 50 computes the speed of the bicycle from a signal supplied by a speed sensor 51. The speed sensor 51 develops one pulse for e.g. every revolution of the rear wheel. The speed computing circuit 50 measures time intervals at which the speed sensor 51 develops pulses. With prior knowledge of the perimeter of the wheel, the speed of the bicycle can be computed from the measured time interval.

The derailleur 44 includes a plurality of speed-changing gears.

The gear with which a chain of the bicycle is to engage is changed by the motor 43 to thereby change the transmission gear ratio in a known manner. The CPU 49 drives the motor 43 through a motor driving circuit 52 to change the transmission gear ratio. The derailleur 44 can make the chain locked so that the bicycle cannot be pedaled.

When the switch 45D is closed to select a first automatic mode, the CPU 49 controls the motor 43 in such a manner as to select a predetermined speed-changing gear for the first automatic mode corresponding to the speed indicated by the speed indicating signal from the speed computing circuit 50.

When the switch 45Ds is closed so that a second automatic mode is selected, the CPU 49 controls the motor 43 to select a predetermined speed-changing gear for the second automatic mode corresponding to the speed indicated by the speed indicating signal from the speed computing circuit 50.

Figure 2:
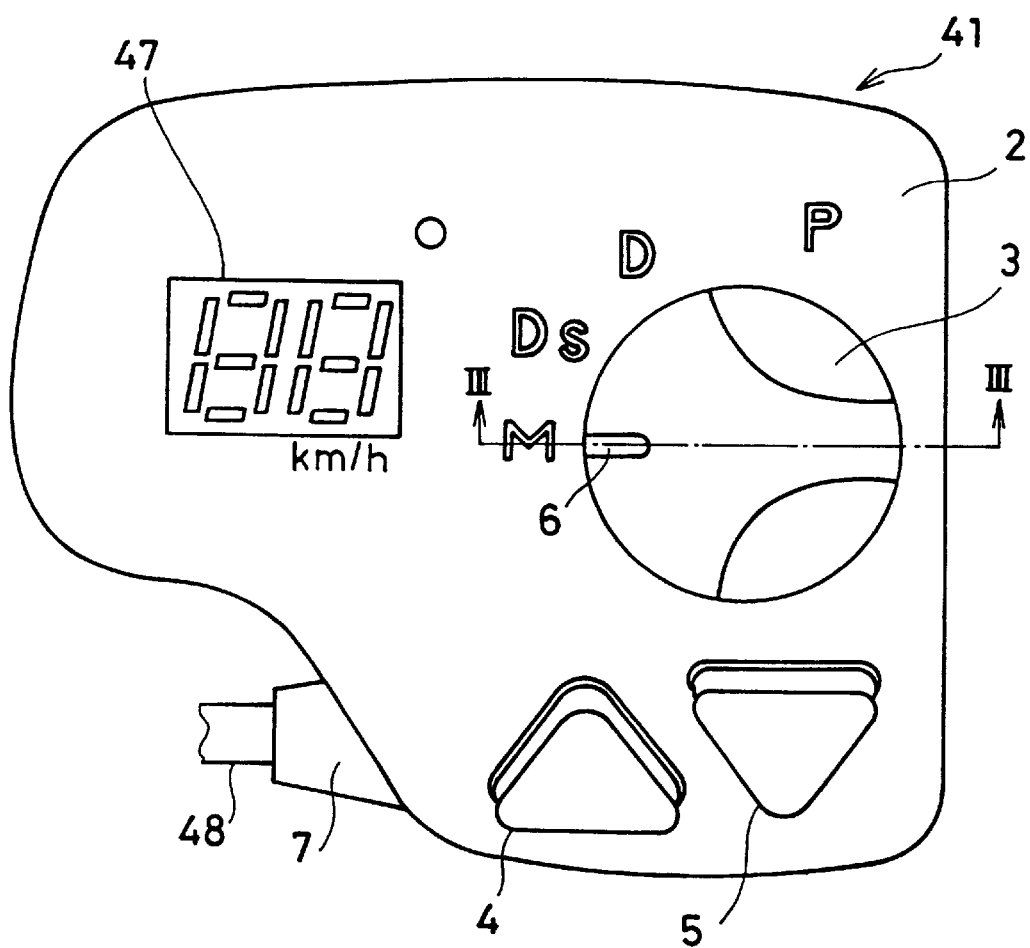
FIG. 2 is a front view of the operating mode switching unit according to an embodiment of the present invention.

When the switch 45M is closed, that is, when a manual mode is selected, the CPU 49 controls the motor 43 so that the gears can be shifted stepwise by manual operation of a button 4 or 5 shown in FIG. 2. Each time the button 4 is pressed, the transmission-gear-ratio increasing switch 46U is closed to increase the transmission gear ratio by one step. Each time the button 5 is pressed, the transmission-gear-ratio decreasing switch 46D is closed to decrease the transmission gear ratio by one step.

When the switch 45P is closed, that is, when a parking mode is selected, the CPU 49 controls the motor 43 to lock the chain so that the bicycle cannot be pedaled.

The indicator 47 indicates the speed of the bicycle in response to the speed indicating signal supplied from, for example, the speed computing circuit 50.

As shown in FIG. 2, a rotary knob 3 having a pointer 6, the buttons 4 and 5, and the indicator 47 are mounted on a front surface of a panel 2 of the operating mode switching unit 41. The switching unit 41 has in its side a cable outlet 7 through which the cable 48 extends. On the panel 2, letters P, D, Ds and M are written around the knob 3 at predetermined positions. The letters P, D, Ds and M indicate the parking mode, the first automatic mode, the second automatic mode and the manual mode, respectively. The buttons 4 and 5 are used for operating the switches 46U and 46D, respectively, as stated above.

Figure 3A:
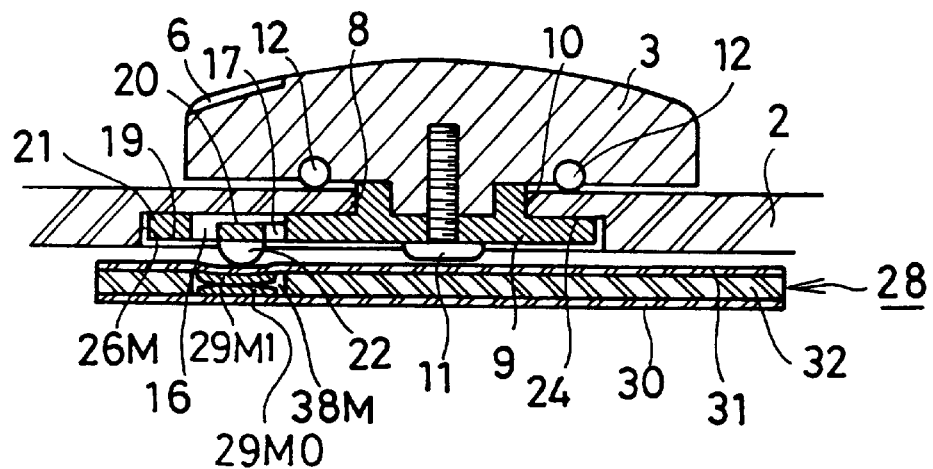
FIG. 3(a) is a vertical cross-sectional view along the line III—III in FIG. 2.
Figure 3B:
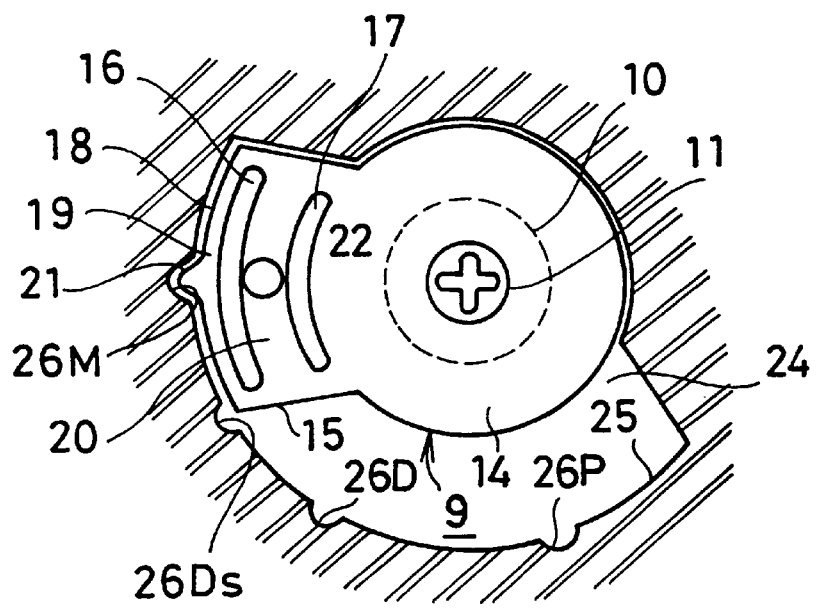
FIG. 3(b) is a rear view of a spring unit used in the operating mode switching unit of FIG. 2.

FIG. 3(*a*) shows a cross-section along the line III—III in FIG. 2. The panel 2 is formed with a round opening 8, into which an axle 10 of a spring unit 9 is inserted from the rear surface of the panel 2. The knob 3 is fixed by a screw 11 to the axle 10. A plurality of balls 12 are disposed between the panel 2 and the knob 3 for smooth rotation of the knob 3.

FIG. 3(*b*) shows a rear surface of the spring unit 9. The spring unit 9 includes a hub 14 from which the axle 10 extends, and a spring assembly 15 extending radially outward from the hub 14. The spring assembly 15 has arc-shaped outer and inner slits 16 and 17 arranged concentrically about the axle 10.

The spring assembly 15 includes a first spring portion 19 defined between the outer slit 16 and an outer edge 18 of the assembly 15, and a second spring portion 20 defined between the slits 16 and 17. The outer edge 18 is also arc-shaped and concentric with the axle 10. The first spring portion 19 can be elastically deformed toward the axle 10. The first spring portion 19 has in its center a protrusion 21 projecting radially outward. The second spring portion 20 can be elastically deformed toward the panel 2. The spring portion 20 has in its center a protrusion 22 projecting in the direction away from the panel 2.

The panel 2 includes in its rear surface a recess 24 having such dimensions as to receive the spring unit 9. One of peripheral walls of the recess 24 is provided by a cylinder surface, which is simply referred to as a wall 25. The wall 25 is concentric with the axle 10, and has a slightly larger radius than the arc-shaped outer edge 18 of the spring assembly 15.

The wall 25 has indentations 26P, 26D, 26Ds and 26M at locations respectively corresponding to the locations of the letters P, D, Ds and M written on the panel 2. Each of the indentations has such dimensions as to receive the protrusion 21 provided in the first spring portion 19.

Figure 4:
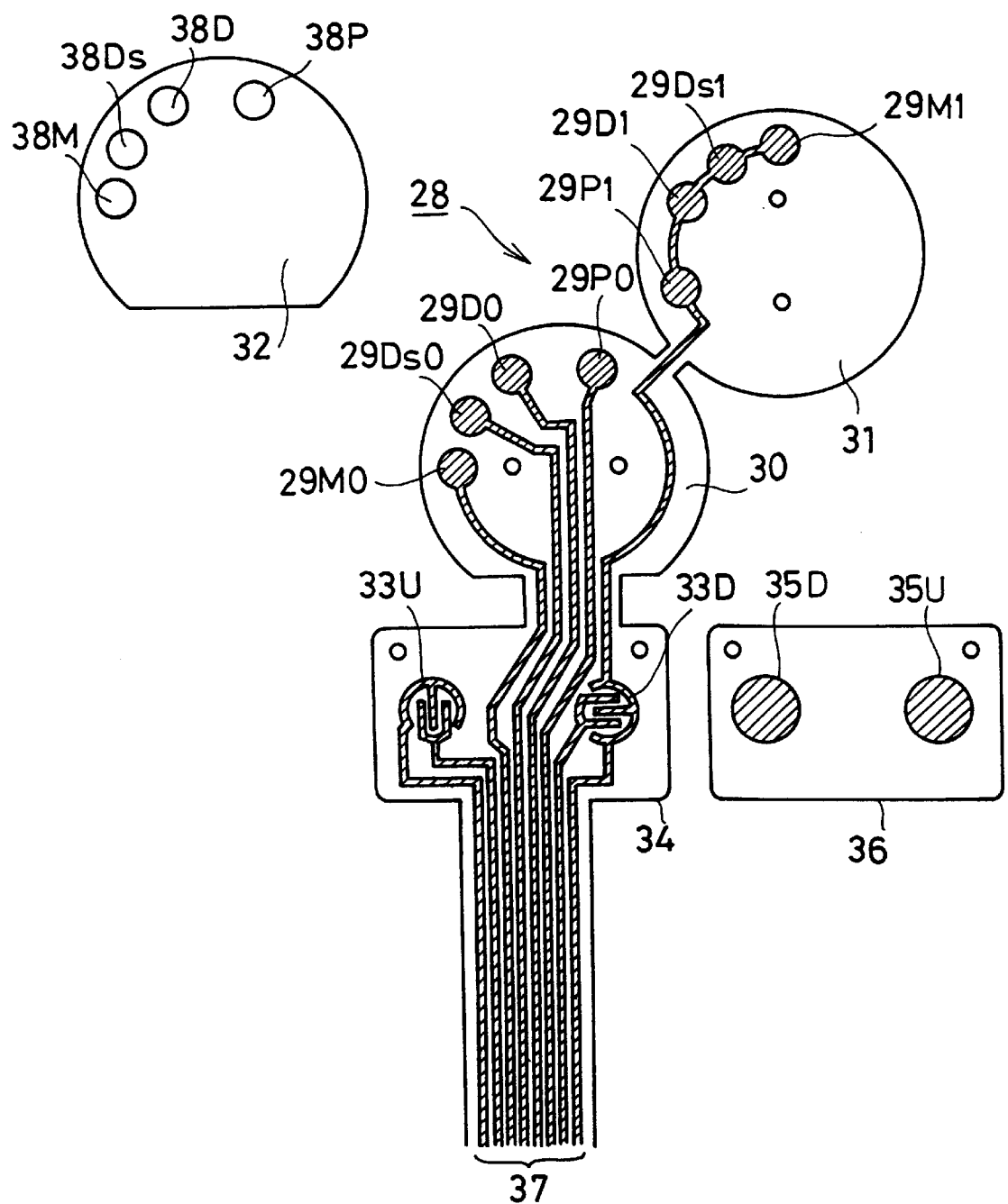
FIG. 4 is an exploded view of a laminate member used in the operating mode switching unit of FIG. 2.

As shown in FIG. 3(*a*), the rear surface of the spring unit 9 faces a laminate member 28. The laminate member 28 includes insulating sheets 30 and 31, and an insulation spacer 32 sandwiched between the sheets 30 and 31, as shown in FIG. 3(*a*). As shown in FIG. 4, the insulating sheet 30 has switch contacts 29P0, 29D0, 29Ds0 and 29M0 formed on its surface facing the insulating spacer 32, and the insulating sheet 31 has switch contacts 29P1, 29D1, 29Ds1 and 29M1 formed on its surface facing the insulating spacer 32, to mate the switch contacts 29P0, 29D0, 29Ds0 and 29M0, respectively. The insulation spacer 32 has round apertures 38P, 38D, 38Ds and 38M formed such that the switch contacts 29P0, 29D0, 29Ds0 and 29M0 face therethrough the switch contacts 29P1, 29D1, 29Ds1 and 29M1, respectively. The pairs of the switch contacts 29P0, 29P1; 29D0, 29D1; 29Ds0, 29Ds1; and 29M0, 29M1, and thus the apertures 38P, 38D, 38Ds and 38M are at locations respectively corresponding to the locations of the letters P, D, Ds and M on the panel 2. The pairs of the switch contacts 29P0, 29P1; 29D0, 29D1; 29Ds0, 29Ds1; and 29M0, 29M1 form the switches 45P, 45D, 45Ds and 45M, respectively, shown in FIG. 1.

For example, as shown in FIG. 2, when the knob 3 is set to the position where the pointer 6 on the knob 3 is aligned with the letter M indicating the manual mode, the protrusion 21 of the first spring portion 19 snaps into the corresponding indentation 26M in the wall 25. At the same time, the protrusion 22 of the second spring portion 20 is on the laminate member 28 at the position where the switch contacts 29M1 and 29M0 and the aperture 38M are disposed. Thus, the protrusion 22 presses the insulating sheet 31 including the switch contact 29M1 down into the aperture 38M. This brings the switch contact 29M1 into contact with the switch contact 29M0, so that the switch 45M of the operating mode switch assembly 45 shown in FIG. 1 is closed and the manual mode is selected. A signal indicating the selection of the manual mode is supplied to the control unit 42 shown in FIG. 1 through the cable outlet 7 and the cable 48 shown in FIG. 2.

When the knob 3 is rotated toward the position where the pointer 6 is aligned with the letters Ds to thereby select the second automatic mode, the protrusion 21 comes out of the indentation 26M and comes into contact with the wall 25 between the indentations 26M and 26Ds, so that the first spring portion 19 becomes deformed toward the axle 10. The protrusion 22 is also driven out of the aperture 38M, so that the switch contact 29M1 is disengaged from the switch contact 29M0, that is, the switch 45 is opened. The protrusion 22 rests on the insulation spacer 32 with the insulating sheet 31 interposed therebetween, whereby the second spring portion 20 becomes deformed toward the panel 2. With the spring portions 19 and 20 deformed, the spring unit 9 is further rotated about the axle 10 so that the pointer 6 points to the letters Ds. Then, the protrusion 21 snaps into the indentation 26Ds and the protrusion 22 snaps into the round aperture 38Ds with the insulating sheet 31 including the switch contact 29Ds1 pressed downward. This brings the switch contacts 29Ds1 and 29Ds0 into contact with each other. Thus, the second automatic mode is selected, and the first and second spring portions 19 and 20 return from the deformed conditions to the normal conditions. Similar operation is provided when the knob 3 is rotated to the position where the pointer 6 is aligned with the letter D or P.

The laminate member 28 shown in FIG. 4 includes insulating sheets 34 and 36, in addition to the insulating sheets 30 and 31. The sheet 34 has switch contacts 33U and 33D, and the sheet 36 has switch contacts 35U and 35D mating the contacts 33U and 33D, respectively. The switch contacts 33U and 35U constitute the switch 46U, and the switch contacts 33D and 35D constitute the switch 46D. Conductors 37 connected to the respective switch contacts in the laminate member 28 and conductors connected to the segments of the indicator 47 are connected through the cable 48 to the control unit 42.

In the above-described embodiment, the spring portions 19 and 20 are supported at both ends thereof, with the respective protrusions 21 and 22 disposed in the center thereof. But, the spring portions 19 and 20 may be supported at only one end, with the protrusions 21 and 22 disposed at the opposite end.

In place of the recess 24 formed in the rear surface of the panel 2, a wall surrounding the spring unit 9 may be erected on the rear surface of the panel 2.

What is claimed is:

1. An operating mode switching unit for a bicycle, comprising:

a panel;

a rotary knob disposed on a first surface of said panel;

a planar spring unit disposed on a second surface of said panel and connected by an axle to said rotary knob, said spring unit having a first spring portion located radially remote from said axle and a second spring portion located between said first spring portion and said axle, said spring unit also including a hub connected to said axle, said hub being integrally formed with said first spring portion and said second spring portion, wherein said first spring portion can be elastically deformed toward said axle and has a first protrusion projecting radially away from the axle, and said second spring portion can be elastically deformed toward said panel and has a second protrusion projecting in the direction away from said panel;

a wall extending generally orthogonally to said panel, said first spring portion being adapted to rotate about said axle along said wall, said wall having at predetermined positions a plurality of indentations which can receive said first protrusion; and a plurality of pairs of contacts facing said panel with said spring unit disposed therebetween, each pair being disposed at a location corresponding to a respective one of said indentations in said wall and brought into contact with each other when pressed by said second protrusion.

2. An operating mode switching unit for a bicycle, comprising:

a panel;

a rotary knob disposed on a first surface of said panel;

a planar spring unit disposed on a second surface of said panel and connected by an axle to said rotary knob, said spring unit having a first spring portion located radially remote from said axle and a second spring portion located between said first spring portion and said axle, said spring unit also having concentric outer and inner arc-shaped slits wherein said first spring portion is defined between said outer slit and an outer edge of said spring unit, and said second spring portion is defined between said outer and inner slits, and wherein said first spring portion can be elastically deformed toward said axle and has a first protrusion projecting radially away from the axle, and said second spring portion can be elastically deformed toward said panel and has a second protrusion projecting in the direction away from said panel;

a wall extending generally orthogonally to said panel, said first spring portion being adapted to rotate about said axle along said wall, said wall having at predetermined positions a plurality of indentations which can receive said first protrusion; and a plurality of pairs of contacts facing said panel with said spring unit disposed therebetween, each pair being disposed at a location corresponding to a respective one of said indentations in said wall and brought into contact with each other when pressed by said second protrusion.

3. The operating mode switching unit according to claim 2 wherein said first and second protrusions are disposed in respective center portions of said first and second spring portions.

4. An operating mode switching unit for a bicycle, comprising:

a panel;

a rotary knob disposed on a first surface of said panel;

a planar spring unit disposed on a second surface of said panel and connected by an axle to said rotary knob, said spring unit having a first spring portion located radially remote from said axle and a second spring portion located between said first spring portion and said axle, wherein said first spring portion can be elastically deformed toward said axle and has a first protrusion projecting radially away from the axle, and said second spring portion can be elastically deformed toward said panel and has a second protrusion projecting in the direction away from said panel;

a wall extending generally orthogonally to said panel, wherein said wall is provided by a wall of a recess formed in said second surface of said panel, said first spring portion being adapted to rotate about said axle along said wall, said wall having at predetermined positions a plurality of indentations which can receive said first protrusion; and a plurality of pairs of contacts facing said panel with said spring unit disposed therebetween, each pair being disposed at a location corresponding to a respective one of said indentations in said wall and brought into contact with each other when pressed by said second protrusion.

* * * * *